(12) United States Patent
Joshi et al.

(10) Patent No.: US 8,012,621 B2
(45) Date of Patent: Sep. 6, 2011

(54) NICKEL-METAL HYDRIDE BATTERY USING ALKALI ION CONDUCTING SEPARATOR

(75) Inventors: Ashok V. Joshi, Salt Lake City, UT (US); John Howard Gordon, Salt Lake City, UT (US); Sai Bhavaraju, West Jordan, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 824 days.

(21) Appl. No.: 11/944,719

(22) Filed: Nov. 26, 2007

(65) Prior Publication Data

US 2009/0134842 A1     May 28, 2009

(51) Int. Cl.
*H01M 10/34* (2006.01)
*H01M 2/16* (2006.01)
*H01M 4/24* (2006.01)
*H01M 10/28* (2006.01)

(52) U.S. Cl. .............. 429/129; 429/206; 429/218.2; 429/247

(58) Field of Classification Search .......... 429/129, 429/206, 218.2, 223, 247
See application file for complete search history.

(56) References Cited

U.S. PATENT DOCUMENTS

| | | | |
|---|---|---|---|
| 1,501,756 A | 7/1924 | Downs | |
| 3,660,170 A | 5/1972 | Rampel | |
| 3,785,965 A | 1/1974 | Welty, A. | |
| 3,787,315 A | 1/1974 | Bearden, Jr. et al. | |
| 3,788,978 A | 1/1974 | Bearden, Jr. et al. | |
| 3,791,966 A | 2/1974 | Bearden | |
| 3,970,472 A | 7/1976 | Steffensen | |
| 4,053,371 A | 10/1977 | Towsley | |
| 4,076,613 A | 2/1978 | Bearden, Jr. | |
| 4,207,391 A | 6/1980 | Church et al. | |
| 4,298,666 A | 11/1981 | Taskier | |
| 4,307,164 A | 12/1981 | Church et al. | |
| 4,372,823 A | 2/1983 | Church et al. | |
| 4,465,744 A * | 8/1984 | Susman et al. | 429/321 |
| 4,479,856 A | 10/1984 | Ando | |
| 4,542,444 A | 9/1985 | Boland | |
| 4,623,597 A | 11/1986 | Sapru et al. | |
| 4,842,963 A | 6/1989 | Ross, Jr. | |
| 5,057,206 A | 10/1991 | Engel et al. | |
| 5,290,405 A | 3/1994 | Joshi et al. | |
| 5,516,598 A | 5/1996 | Visco et al. | |
| 5,541,019 A * | 7/1996 | Anani et al. | 429/59 |
| 5,580,430 A | 12/1996 | Balagopal et al. | |

(Continued)

FOREIGN PATENT DOCUMENTS

JP     08321322 A * 12/1996

(Continued)

OTHER PUBLICATIONS

IPDL Machine Translation of Abstract and Detailed Description of JP 08-321322A (Dec. 1996).*

(Continued)

*Primary Examiner* — Gregg Cantelmo
(74) *Attorney, Agent, or Firm* — David Fonda

(57) ABSTRACT

A nickel-metal hydride storage battery comprising a positive electrode containing nickel hydroxide, a negative electrode containing a hydrogen absorbing alloy, an alkaline electrolyte, and an alkali conducting separator provided between the positive electrode and the negative electrode. The alkali conducting separator may be a solid alkali metal ion super ion conducting material, wherein the alkali metal is Na, K, or Li.

46 Claims, 2 Drawing Sheets

U.S. PATENT DOCUMENTS

| | | | |
|---|---|---|---|
| 5,695,632 | A | 12/1997 | Brons et al. |
| 5,780,186 | A | 7/1998 | Casey, Jr. |
| 5,856,047 | A | 1/1999 | Venkatesan et al. |
| 5,882,812 | A | 3/1999 | Visco et al. |
| 5,935,421 | A | 8/1999 | Brons et al. |
| 6,017,651 | A | 1/2000 | Nimon et al. |
| 6,025,094 | A | 2/2000 | Visco et al. |
| 6,030,720 | A | 2/2000 | Chu et al. |
| 6,110,236 | A | 8/2000 | Tsang et al. |
| 6,153,328 | A | 11/2000 | Colborn |
| 6,159,634 | A | 12/2000 | Yen et al. |
| 6,165,644 | A | 12/2000 | Nimon et al. |
| 6,200,704 | B1 | 3/2001 | Katz et al. |
| 6,210,564 | B1 | 4/2001 | Brons et al. |
| 6,210,832 | B1 | 4/2001 | Visco et al. |
| 6,214,061 | B1 | 4/2001 | Visco et al. |
| 6,225,002 | B1 | 5/2001 | Nimon et al. |
| 6,248,481 | B1 | 6/2001 | Visco et al. |
| 6,265,100 | B1 | 7/2001 | Saaski et al. |
| 6,310,960 | B1 | 10/2001 | Saaski et al. |
| 6,358,643 | B1 | 3/2002 | Katz et al. |
| 6,368,486 | B1 | 4/2002 | Thompson et al. |
| 6,402,795 | B1 | 6/2002 | Chu et al. |
| 6,413,284 | B1 | 7/2002 | Chu et al. |
| 6,413,285 | B1 | 7/2002 | Chu et al. |
| 6,416,903 | B1 | 7/2002 | Fierro et al. |
| 6,432,584 | B1 | 8/2002 | Visco et al. |
| 6,537,701 | B1 | 3/2003 | Nimon et al. |
| 6,610,440 | B1 | 8/2003 | LaFollette et al. |
| 6,632,573 | B1 | 10/2003 | Nimon et al. |
| 6,737,197 | B2 | 5/2004 | Chu et al. |
| 6,787,019 | B2 | 9/2004 | Jacobson et al. |
| 6,852,450 | B2 | 2/2005 | Hwang et al. |
| 6,881,234 | B2 | 4/2005 | Towsley |
| 6,911,280 | B1 | 6/2005 | De Jonghe et al. |
| 6,955,753 | B1 | 10/2005 | Gomez |
| 6,955,866 | B2 | 10/2005 | Nimon et al. |
| 6,991,662 | B2 | 1/2006 | Visco et al. |
| 7,070,632 | B1 | 7/2006 | Visco et al. |
| 7,144,654 | B2 | 12/2006 | LaFollette et al. |
| 7,166,384 | B2 | 1/2007 | LaFollette et al. |
| 7,214,443 | B2 | 5/2007 | Clarke et al. |
| 7,259,126 | B2 | 8/2007 | Gordon et al. |
| 7,282,295 | B2 | 10/2007 | Visco et al. |
| 7,282,296 | B2 | 10/2007 | Visco et al. |
| 7,282,302 | B2 | 10/2007 | Visco et al. |
| 7,390,591 | B2 | 6/2008 | Visco et al. |
| 7,432,017 | B2 | 10/2008 | Visco et al. |
| 7,482,096 | B2 | 1/2009 | De Jonghe et al. |
| 7,491,458 | B2 | 2/2009 | Visco et al. |
| 2002/0150818 | A1 | 10/2002 | Amatucci et al. |
| 2004/0229107 | A1 | 11/2004 | Smedley |
| 2005/0109617 | A1 | 5/2005 | Ono et al. |
| 2005/0175894 | A1 | 8/2005 | Visco et al. |
| 2006/0096893 | A1 | 5/2006 | De Almeida et al. |
| 2006/0141346 | A1 | 6/2006 | Gordon et al. |
| 2006/0177732 | A1 | 8/2006 | Visco et al. |
| 2006/0257734 | A1 | 11/2006 | Obata et al. |
| 2007/0048610 | A1 | 3/2007 | Tsang et al. |
| 2007/0172739 | A1 | 7/2007 | Visco et al. |
| 2008/0268327 | A1 | 10/2008 | Gordon et al. |
| 2009/0061288 | A1 | 3/2009 | Gordon et al. |
| 2009/0136830 | A1 | 5/2009 | Gordon |

FOREIGN PATENT DOCUMENTS

| | | | |
|---|---|---|---|
| JP | 2002245847 A | * | 8/2002 |

OTHER PUBLICATIONS

Goodenough, J.B. et al., "Fast Na+ -Ion Transport in Skeleton Structures", *Mat. Res. Bull.*, vol. 11, Pergamon Press, Inc. Printed in the United States, (1976),203-220.

Hong, H.Y-P. et al., "Crystal Structures and Crystal Chemistry in the System Na1+xZr2SixP3-xO12", *Mat. Res. Bull.*, vol. 11, 1976. Pergamon Press, Inc. Printed in the United States.,(1976),173-186.

Bentzen, J. J., et al., "The preparation and characterization of dense, highly conductive Na5GdSi4O12 nasicon (NGS)", *Materials Research Bulletin*, vol. 15,(1980),1737-1745.

Delmas, C. et al., "Crystal chemistry of the Na1+xZr2-xLx(PO4)3 (L = Cr, In, Yb) solid solutions", *Materials Research Bulletin*, vol. 16,(1981),285-290.

Von Alpen, V. et al., "Compositional dependence of the electrochemical and structural parameters in the NASICON system (Na1+xSixZr2P3-xO12)", *Solid State Ionics*, vol. 3/4,(1981),215-218.

Fujitsu, S. et al., "Conduction paths in sintered ionic conductive material Na1+xYxZr2-x(PO4)3", *Materials Research Bulletin*, vol. 16,(1981),1299-1309.

Saito, Y. et al., "Ionic Conductivity of NASICON-type conductors Na1.5M0.5Zr1.5(PO4)3 (M: Al3+, Ga3+, Cr3+, Sc3+, Fe3+, In3+, Yb3+, Y3+)", *Solid State Ionics*, vol. 58,(1992),327-331.

Alamo, J. "Chemistry and properties of solids with the [NZP] skeleton", *Solid State Ionics*, vol. 63-65,(1993),547-561.

Shimazu, K. et al., "Electrical conductivity and Ti4+ ion substitution range in NASICON system", *Solid State Ionics*, vol. 79, (1995),106-110.

Miyajima, Y. et al., "Ionic conductivity of NASICON-type Na1+xMxZr2-xP3O12(M: Yb, Er, Dy)", *Solid State Ionics*, vol. 84,(1996),61-64.

Manickam, Minakshi et al., "Lithium insertion into manganese dioxide electrode in MnO2/Zn aqueous battery Part I. A preliminary study", *Journal of Power Sources*, vol. 130, Issues 1-2 (Obtained through ScienceDirect),(May 2004),254-259.

Sumathipala, et al., "Novel Li+ Ion Conductors and Mixed Conductors, Li3+xSixCr1-xO4 and a Simple Method for Estimating Li+/e- Transport Numbers", *J. Electrochem. Soc.*, vol. 142, No. 7,(Jul. 1995),2138-2143.

Kowalczk, et al., "Li-air batteries: A classic example of limitations owing to solubilities", *Pure Appl. Chem.*, vol. 79, No. 5,(2007),851-860.

Read, "Characterization of the Lithium/Oxygen Organic Electrolyte Battery", *J. Electrochem. Soc.*, vol. 149, No. 9,(2002),A1190-A1195.

Panero, et al., "High Voltage Lithium Polymer Cells Using a PAN-Based Composite Electrolyte", *J. Electrochem. Soc.*, vol. 149, No. 4,(2002),A414-A417.

Dissanayake, et al., "Lithium ion conducting Li4-2xGe1-xSxO4 solid electrolytes", *Solid State Ionics*, 62,(1993),217-223.

Balagopal, et al., "Selective sodium removal from aqueous waste streams with NaSICON ceramics", *Separation and Purification Technology*,15,(1999),231-237.

Sagane, et al., "Li+ and Na+ transfer through interfaces between inorganic solid electrolytes and polymer or liquid electrolytes", *Journal of Power Sources*, 146, (2005), 749-752.

Wang, et al., "LiTi2(PO4)3 with NASICON-type structure as lithium-storage materials", *Journal of Power Sources*, 124,(2003),231-236.

Dissanayake, et al., "New solid electrolytes and mixed conductors: Li3+xCr1-xMxO4: M = Ge, Ti", *Solid State Ionics*, 76,(1995),215-220.

Kerr, "Polymeric Electrolytes: An Overview", *Lithium Batteries: Science and Technology*, Chapter 19, edited by Nazri and Pistoia, Kluwer Academic Publishers,(2004),574-622.

Young, Lee W., "International Search Report", PCT Search Report for App. No. PCT/US 07/21978, (Oct. 10, 2008),1-2.

Young, Lee W., "Written Opinion of the International Searching Authority", PCT Written Opinion for App. No. PCT/US 07/21978, (Oct. 10, 2008),1-5.

Young, Lee W., "International Search Report", PCT Search Report for App.No. PCT/US 08/10435, (Nov. 25, 2008),1-2.

Young, Lee W., "Written Opinion of the International Searching Authority", PCT Written Opinion for App. No. PCT/US 08/10435, (Nov. 25, 2008),1-4.

Fu, "Effects of M3+ Ions on the Conductivity of Glasses and Glass-ceramics in the system Li2O-M2O3-GeO2-P2O5 (M = Al, Ga, Y, Dt, Gd, and La)", *Communications of the American Ceramic Society*, vol. 83, No. 4, (Apr. 2000),104-106.

Thokchom, et al., "Superionic Conductivity in a Lithium Aluminum Germanium Phosphate Glass-Ceramic", *Journal of the Electrochemical Society*, 155 (12) (Oct. 8, 2008),A915-A920.

Fu, "Fast Li+ Ion Conducting Glass Ceramics in the System Li2O-Al2O3-TiO2-P2O5", *Science Direct, Solid State Ionics*, vol. 104, Issues 3-4, (Dec. 11, 1997),191-194.

Saienga, et al., "The Comparative Structure, Property, and Ionic Conductivity of LiI + Li2S + GeS2 Glasses Doped with Ga2S3 and La2S3", *Journal of Non-Crystalline Solids*, vol. 354, 14, (Mar. 1, 2008),Abstract.

Wang, et al., "Polymer Composite Electrolytes Containing Active Mesoporous SiO2 Particles", *Journal of Applied Physics*, 102, (2007),1-6.

Wang, et al., "Li1.3Al0.3Ti1.7(PO4)3 Filler Effect on (PEO)LiClO4 Solid Polymer Electrode", *Department of Materials Science and Engineering, Zhejiang University*, (2004),Abstract.

Kim, "International Search Report", International App. No. PCT/US2008/084707, (Apr. 29, 2009),1-3.

Kim, "Written Opinion of the International Searching Authority", International App. No. PCT/US2008/084707, (Apr. 29, 2009),1-4

Park, Jin "Written Opinion of the International Searching Authority Mailed on Jun. 30, 2009", Int. App. No. PCT/US2008/084572, 1-3.

Park, Jin "International Search Report Mailed on Jun. 30, 2009", Int. App. No. PCT/US2008/084572, 1-3.

Kim, Jun Hak "Written Opinion of the International Searching Authority Mailed on Aug. 24, 2009", Int. App. No. PCT/US2009/032458, 1-4.

Kim, Jun Hak "International Search Report Mailed on Aug. 24, 2009", Int. App. No. PCT/US2009/032458, 1-3.

Park, Jin "Written Opinion of the International Searching Authority", 1-3.

Park, Jin "International Search Report", 1-3.

\* cited by examiner

NICKEL-METAL HYDRIDE BATTERY USING ALKALI ION CONDUCTING SEPARATOR

BACKGROUND OF THE INVENTION

This invention relates to a nickel-metal hydride battery that includes a non-porous, alkali ion conducting separator.

Nickel-metal hydride storage batteries are widely used for the power sources of cordless electronic equipment, power tools, electric vehicles and the like. Conventional nickel-metal hydride batteries are composed of a positive electrode containing nickel hydroxide, a negative electrode containing a hydrogen-absorbing metal alloy, a separator interposed between the positive and negative electrodes, and an electrolyte. FIG. 1 shows a schematic representation of typical nickel metal hydride battery 10 having a positive electrode 12, a negative electrode 14, and a separator 16.

The nickel hydroxide positive electrodes are similar in design to conventional nickel-cadmium electrodes. Pasted and sintered-type positive electrodes have proven to be economical and rugged, exhibiting excellent high-rate performance, long cycle life, and good capacity.

The hydrogen-absorbing metal alloys used in the negative electrode were developed in the 1970s from research on the storage of hydrogen for use as an alternative energy source. Some metallic alloys were observed to form hydrides that could capture (and release) hydrogen in volumes up to nearly a thousand times their own volume. By careful selection of the alloy constituents and proportions, the thermodynamics could be balanced to permit the absorption and release process to proceed at room temperatures and pressures. In such alloys, the small hydrogen atom is absorbed into the interstices of a bimetallic alloy crystal structure.

The separator provides electrical isolation between the electrodes while still allowing efficient ionic transport between them. The separators used in nickel metal hydride cells are often similar to those used in nickel-cadmium cells and typically include woven or nonwoven fabric comprising a polyamide and polyolefin, or a porous film of a fluorine plastic film. A known effective separator is a nylon fiber blend. Other polymeric fibers are used in separators. a woven or nonwoven is generally used The electrolyte used in the nickel-metal hydride cell is alkaline. It commonly includes an aqueous solution of potassium hydroxide. The electrolyte may contain other minor constituents to enhance cell performance.

The charge and discharge reactions for nickel-metal hydride batteries are shown below:

| Positive electrode: | $Ni(OH)_2 + OH^- \rightarrow NiOOH + H_2O + e^-$ | (charge) |
| --- | --- | --- |
| | $NiOOH + H_2O + e^- \rightarrow Ni(OH)_2 + OH^-$ | (discharge) |
| Negative electrode: | $M + H_2O + e^- \rightarrow MH_{ab} + OH^-$ | (charge) |
| | $MH_{ab} + OH^- \rightarrow M + H_2O + e^-$ | (discharge) |
| Overall reaction: | $Ni(OH)_2 + M \rightarrow NiOOH + MH_{ab}$ | (charge) |
| | $NiOOH + MH_{ab} \rightarrow Ni(OH)_2 + M$ | (discharge) |

Where M is a hydrogen absorbing alloy and $H_{ab}$ is absorbed hydrogen. From the overall reactions shown above, hydrogen moves from the positive to negative electrode during charge and reverses direction during discharge, with the electrolyte taking no part in the reaction.

Self-discharge is a phenomenon in essentially all rechargeable batteries in which internal chemical reactions reduce the stored charge of the battery without any connection between the electrodes. Self-discharge decreases the shelf-life of batteries and causes them to have less charge than expected when actually put to use. How fast self-discharge in a battery occurs is dependent on the type of battery and temperature. Nickel-based batteries are significantly affected by self-discharge (nickel cadmium, 15-20% per month; nickel metal hydride, 30% per month). Self-discharge is a chemical reaction and tends to occur more quickly at higher temperatures. Storing batteries at lower temperatures may reduce the rate of self-discharge and preserve the initial energy stored in the battery.

Without being bound by theory, it is believed the self-discharge problem associate with nickel metal hydride batteries is a result of hydrogen passing through the porous separator.

It would be an improvement in the art to provide a nickel metal hydride battery with reduced or limited self-discharge.

BRIEF SUMMARY OF THE INVENTION

In accordance with the present invention, there is provided herein a nickel-metal hydride battery that contains an alkali ion conducting separator configured to selectively transport alkali ions. The nickel-metal hydride battery is structurally similar to conventional nickel-metal hydride batteries and contains a positive electrode and a negative electrode. The alkali ion conducting separator is disposed between the positive and negative electrodes. The separator may be substantially non-porous. The battery includes an alkaline electrolyte, such as an alkali metal hydroxide.

The separator is preferably an alkali ion conducting solid electrolyte configured to selectively transport alkali ions. It may be a specific alkali ion conductor. For example, the alkali ion conducting solid electrolyte may be a solid MeSICON (Metal Super Ion CONducting) material, where Me is Na, K, or Li. The alkali ion conducting solid electrolyte may comprise a material having the formula $Me_{1+x}Zr_2Si_xP_{3-x}O_{12}$ where $0 \leq x \leq 3$, where Me is Na, K, or Li. Other alkali ion conducting solid electrolytes may comprise a material having the formula $Me_5RESi_4O_{12}$ where Me is Na, K, or Li, where RE is Y, Nd, Dy, or Sm, or any mixture thereof. The alkali ion conducting solid electrolyte may comprise a non-stoichiometric alkali-deficient material having the formula $(Me_5RESi_4O_{12})_{1-\delta}(RE_2O_3 \cdot 2SiO_2)_\delta$, where Me is Na, K, or Li, where RE is Nd, Dy, or Sm, or any mixture thereof and where $\delta$ is the measure of deviation from stoichiometry. The alkali ion conducting separator may be beta-alumina.

Alternatively, an alkali ion conducting, substantially non-porous polymer separator may also be used. Such polymer separators may include a cation exchange membrane material made of a polymer with fixed anionic functional groups attached to a polymer backbone and alkali metal cations as mobile species. A non-limiting example of such a cation exchange membrane is Nafion® produced by DuPont or Fumapem® produced by Fumatech GMBH or CM1 produced by Tokuyama Corporation.

The alkali ion conducting separator may be configured in the form of a monolithic flat plate, a monolithic tube, a monolithic honeycomb, or supported structures of the foregoing. The alkali ion conducting separator may be a flexible sheet of the polymer configured in various forms applicable to the intended application. The alkali ion conducting separator may be a flexible sheet composed of a mixture of polymer and ceramic and configured in a variety of forms. The alkali ion conducting separator may be configured as a layered alkali ion conducting ceramic-polymer composite membrane comprising alkali ion selective polymers layered on alkali ion conducting ceramic solid electrolyte materials.

The charge and discharge reactions for nickel-metal hydride battery within the scope of the invention, using sodium as a representative alkali metal, are shown below:

| | | |
|---|---|---|
| Positive electrode: | $Ni(OH)_2 + NaOH \rightarrow NiOOH + H_2O + Na^+ + e^-$ | (charge) |
| | $NiOOH + H_2O + Na^+ + e^- \rightarrow Ni(OH)_2 + NaOH$ | (discharge) |
| Negative electrode: | $M + H_2O + e^- + Na^+ \rightarrow MH_{ab} + NaOH$ | (charge) |
| | $MH_{ab} + NaOH \rightarrow M + H_2O + e^- + Na^+$ | (discharge) |
| Overall reaction: | $Ni(OH)_2 + M \rightarrow NiOOH + MH_{ab}$ | (charge) |
| | $NiOOH + MH_{ab} \rightarrow Ni(OH)_2 + M$ | (discharge) |

Where M is a hydrogen absorbing alloy and $H_{ab}$ is absorbed hydrogen.

In the present battery using the alkali metal ion conducting separator, the current carrying species in the electrolyte are exclusively alkali metal ions. Also the concentrations of the electrolyte change at both electrodes during battery operation because the non porous separator prevents mixing of electrolyte from both the compartments. This advantageously prevents transport of unwanted species from one electrode to the other and substantially eliminates capacity loss and self discharge. In one embodiment of the invention, the separator is a substantially non-porous ceramic separator material. The substantially non-porous ceramic separator material may include pockets of porosity, but it should not have "through-porosity." The substantially non-porous separator is preferably hermetic or gas-impermeable. However, the substantially non-porous separator used within the scope of the present invention may possess a trace amount of through porosity and/or gas permeability. The term substantially non-porous is intended to differentiate the prior art separators that are substantially porous.

The separator conducts alkali ions, but is substantially impermeable to hydrogen. Without being bound by theory, it is presently believed that self-discharge of the nickel-metal hydride battery may be substantially reduced or eliminated by preventing hydrogen from passing from the negative electrode to the positive electrode. The solid electrolyte separator being non porous prevents any hydrogen transport to the positive electrode while the polymer separator will allow some diffusion of hydrogen although lower than a microporous separator commonly used in the prior art. The NiMH battery within the scope of the present invention can be stored and used at higher temperature than the prior art because of the minimal self discharge.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of cells, membranes, processes, methods, etc., to provide a thorough understanding of embodiments of the invention. One skilled in the relevant art will recognize, however, that the invention may be practiced without one or more of the specific details or method steps, or with other methods, components, materials, and so forth. In other instances, well-known structures, materials, or operations are not shown or described in detail to avoid obscuring aspects of the invention.

Figure 1:
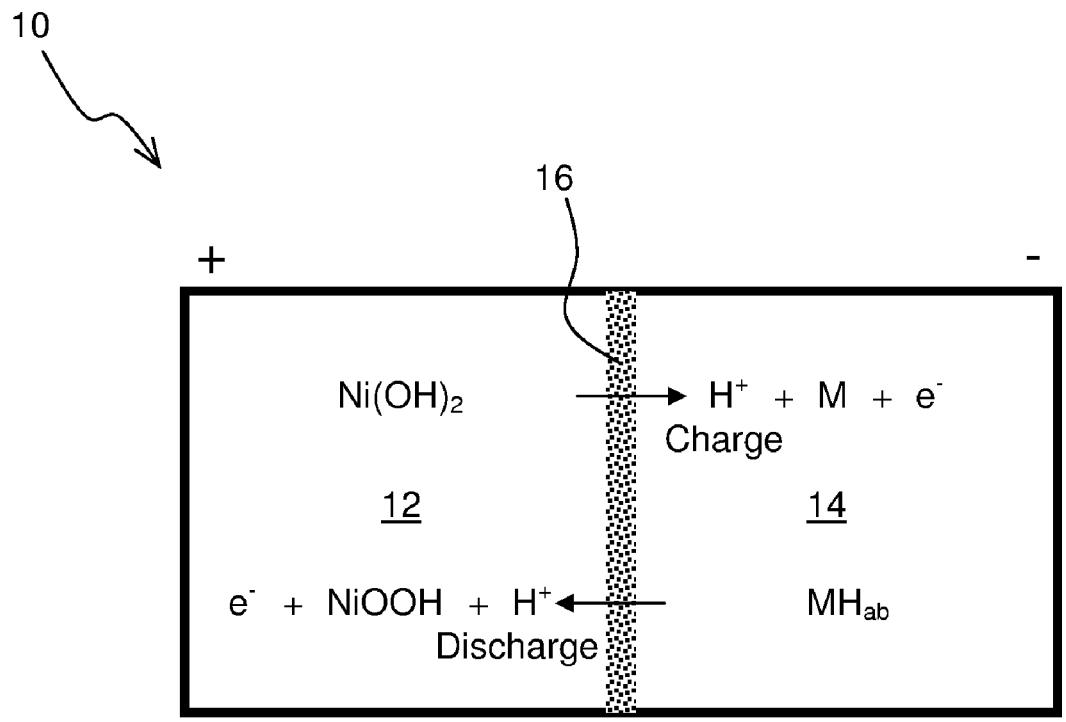
FIG. 1 is a schematic representation of a conventional nickel-metal hydride battery.

The embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the nickel-metal hydride battery using an alkali metal conducting separator within the scope of the present invention as represented in FIGS. 1 and 2, is not intended to limit the scope of the invention, as claimed, but is merely representative of the embodiments of the invention.

Figure 2:
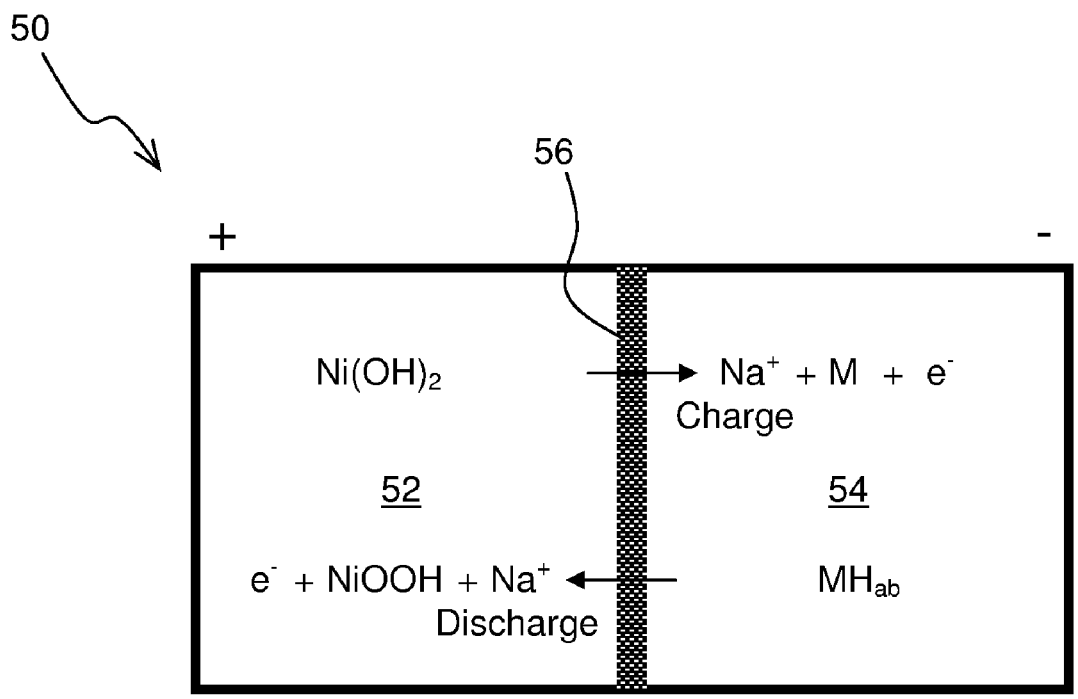
FIG. 2 is a schematic representation of a nickel-metal hydride battery within the scope of the invention.

Referring to FIG. 2, there is provided a schematic representation of a nickel-metal hydride battery 50 within the scope of the invention. In one embodiment, battery 50 includes a positive electrode 52, a negative electrode 54, and an alkali ion conducting separator 56. While not shown in FIG. 2, the battery 50 includes an electrolyte, such as an alkali metal hydroxide. The electrolyte may contain other minor constituents to enhance cell performance.

The positive electrode 52 may comprise nickel hydroxide ($Ni(OH)_2$) or other materials used in conventional nickel-metal hydride batteries. In some embodiments, the positive electrode may be a pasted or sintered-type material.

The negative electrode 54 may comprise a hydrogen-absorbing alloy. Such alloys are known in the art. Examples of early hydrogen-absorbing alloys include NiFe, $Mg_2Ni$, and $LaNi_5$. These hydrogen-absorbing alloys combine metal (A) whose hydrides generate heat exothermically with metal (B) whose hydrides generate heat endothermically to produce the suitable binding energy so that hydrogen can be absorbed and released at or around normal temperature and pressure levels. Depending on how metals A and B are combined, the alloys are classified into the following types: AB (TiFe, etc.), $AB_2$ ($ZnMn_2$, etc.), $AB_5$ ($LaNi_5$, etc.) and $A_2B$ ($Mg_2Ni$, etc.).

Of the foregoing general types of hydrogen absorbing metal alloys, two general classes of metallic alloys are identified as possessing characteristics desirable for battery cell use because of their good charge and discharge efficiency and durability. These are rare earth/nickel alloys generally based around $LaNi_5$ (the so-called $AB_5$ class of alloys) and alloys consisting primarily of titanium and zirconium (designated as $AB_2$ alloys). In both cases, some fraction of the base metals is often replaced with other metallic elements. The $AB_5$ formulation appears to offer the best set of features for commercial nickel-metal hydride cell applications. The metal hydride electrode has a theoretical capacity approximately 40 percent higher than the cadmium electrode in a nickel-cadmium couple. As a result, nickel-metal hydride cells provide energy densities that are 20-40 percent higher than the equivalent nickel-cadmium cell.

The balance between the positive and negative electrodes may be adjusted so that the cell is positive-limited. This means that the negative electrode possesses a greater capacity than the positive. The positive electrode will reach full capacity first as the cell is charged. On overcharge, the positive electrode will generate oxygen gas that may vent to the negative electrode where it is recombined to form water or reduced to form hydroxide ions. Similarly on overdischarge, the positive electrode will generate hydrogen gas that may vent to the negative electrode where it is oxidized to form water.

| Positive electrode: | $4 OH^- \rightarrow 2 H_2O + O_2 + 4e^-$ | (Overcharge) |
|---|---|---|
| Negative electrode: | $2 H_2O + O_2 + 4e^- \rightarrow 4 OH^-$ | |
| Positive electrode: | $2 H_2O + 2e^- \rightarrow H_2 + 2 OH^-$ | (Overdischarge) |
| Negative electrode: | $H_2 + 2 OH^- \rightarrow 2 H_2O + 2e^-$ | |

The means of venting the gases produced at the positive electrode to the negative electrode may be a one way check valve. For example, wherein overcharging generates oxygen at the positive electrode, the oxygen can be directed through a one way check valve to the negative electrode which can reduce the oxygen. Similarly, when overdischarging generates hydrogen at the positive electrode, the hydrogen can be directed through a one way check valve to the negative electrode which can reduce the hydrogen. Alternatively, by limiting the amount of electrolyte provided for either positive or negative electrode reactions, the overcharge or overdischarge can be avoided. Such a feature is not possible with prior art constructions. The electrolytes on each side of the separator may have different alkalinity. Similarly, the electrolyte concentration may be selected to limit the capacity of the battery and to prevent overcharging and overdischarging.

The alkali ion conducting separator 56 provides electrical isolation between the electrodes while still allowing cationic transport between them. In one embodiment, the separator 56 is a substantially non-porous alkali ion conducting separator. This may be accomplished using a dense alkali ion conductor. In one embodiment, the solid alkali electrolyte has high ionic conductivity with minimal or negligible electronic conductivity. The alkali ion conducting separator may have high selectivity to preferred ionic species.

The alkali ion conducting separator 56 may selectively transport a particular, desired alkali metal cation species between the negative and positive electrodes even in the presence of other cation species. The alkali ion conducting separator 16 may also be substantially impermeable to water, hydrogen and/or other undesired metal cations.

This impermeability of the separator can be advantageously used by having two dissimilar alkaline electrolytes on either side of the separator without coming into contact with each other. For example, an oxygen scavenger can be placed in the positive electrode compartment to withhold the oxygen produced on overcharge. The oxygen scavenger can either be present in the electrolyte or can be in a gas permeable but electrolyte impermeable pack located in the positive electrode compartment. The oxygen scavenger may be reversible or irreversible. Examples of such oxygen scavengers include ferrous oxide, unsaturated hydrocarbons, sulfites, cobalt (II) amine complexes, benzoacrylates, cobalt catalyzed nylon MXD6 imbedded in the plastic structure (Oxbar™). Alternatively a hydrogen scavenger may be used instead of an oxygen scavenger to withhold the hydrogen produced on overdischarge. Examples of hydrogen scavengers include palladium metal, organic nitro compounds, furans, norbornadiene and other unsaturated hydrocarbons.

Similarly a unique electrolyte may be used in the negative electrode compartment. For example an inhibitor to prevent the corrosion of the negative electrode can be located within the negative electrode compartment. The corrosion inhibitor can reduce corrosion of the electrode either in the charge or discharge state. An example of corrosion inhibitor of the metal hydride electrode during charge-discharge cycling is zincate present in the electrolyte at the negative In some embodiments, the nickel-metal hydride battery may be operated at temperatures from about −40° C. to about 120° C.

A variety of alkali ion conducting separator materials are known in the art and would be suitable for constructing the alkali ion conducting separator 56 of the present invention, as would be understood by one of ordinary skill in the art. In accordance with the present invention, in some specific embodiments alkali ion conducting separator 56 compositions comprising an alkali metal ion super ionic conductor (MeSICON, where Me is Na, K, or Li) materials are utilized for their characteristics of high ion-conductivity for alkali ions at low temperatures, selectivity for alkali ions, current efficiency and chemical stability in water, ionic solvents, and corrosive alkali media under static and electrochemical conditions. Such alkali ion conducting separators 56 may have desirable characteristics which make them suitable for use in nickel-metal hydride battery applications. One such characteristic is that, being dense, the separator 56 is at least substantially impervious to hydrogen transport which may greatly limit or prevent self-discharge.

As noted above, in some specific embodiments, the alkali cation conducted by the alkali ion conducting separator is the sodium ion (Na$^+$). In some specific embodiments, sodium-ion conducting ceramic membranes comprise materials of general formula Na$_{1+x}$Zr$_2$Si$_x$P$_{3-x}$O$_{12}$ where $0 \leq x \leq 3$, as disclosed in U.S. Pat. No. 5,290,405. The alkali ion conducting separator may include materials of general formula Na$_5$RESi$_4$O$_{12}$ and non-stoichiometric sodium-deficient materials of general formula (Na$_5$RESi$_4$O$_{12}$)$_{1-\delta}$(RE$_2$O$_3$.2SiO$_2$)$_\delta$, where RE is Nd, Dy, or Sm, or any mixture thereof and where $\delta$ is the measure of deviation from stoichiometry, as disclosed in U.S. Pat. No. 5,580,430. Analogs of these sodium-conducting solid electrolyte materials transport other alkali ions such as Li and K.

In some specific embodiments, the alkali ion conducting separator material may include at least one of the following: materials of general formula Me$_{1-x}$Me$'_2$Si$_x$P$_{3-x}$O$_{12}$ where $0 \leq x \leq 3$, where Me is selected from the group consisting of Li, Na, K, or mixture thereof, and where Me$^I$ is selected from the group consisting of Zr, Ge, Ti, Sn, or Hf, or mixtures thereof; materials of general formula Na$_{1+z}$L$_z$Zr$_{2-z}$P$_3$O$_{12}$ where $0 \leq z \leq 2.0$, and where L is selected from the group consisting of Cr, Yb, Er, Dy, Sc, Fe, In, or Y, or mixtures or combinations thereof; materials of general formula Me$^{II}_5$RESi$_4$O$_{12}$, where Me$^{II}$ may be Li, Na, or any mixture or combination thereof, and where RE is Y or any rare earth element. In some specific embodiments, the alkali conducting solid electrolyte materials may include at least one of the following: non-stoichiometric materials, zirconium-deficient (or sodium rich) materials of general formula Na$_{1+x}$Zr$_{2-x/3}$Si$_x$P$_{3-x}$O$_{12-2x/3}$ where $1.55 \leq x \leq 3$. In some specific embodiments, the alkali ion conducting solid electrolyte materials may include at least one of the following: non-stoichiometric materials, sodium-deficient materials of general formula Na$_{1+x}$(A$_y$Zr$_{2-y}$)(Si$_z$P$_{3-z}$)O$_{12-\delta}$ where A is selected from the group consisting of Yb, Er, Dy, Sc, In, or Y, or mixtures or combinations thereof, $1.8 \leq x \leq 2.6$, $0 \leq y \leq 0.2$, $x<z$, and $\delta$ is selected to maintain charge neutrality. In some specific embodiments, the solid electrolyte materials may include sodium-deficient materials of formula Na$_{3.1}$Zr$_2$Si$_{2.3}$P$_{0.7}$O$_{12-\delta}$.

Other exemplary sodium super ion conducting materials (NaSICON-type materials) are described by H. Y—P. Hong in "Crystal structures and crystal chemistry in the system Na$_{1+x}$Zr$_2$Si$_x$P$_{3-x}$O$_{12}$", Materials Research Bulletin, Vol. 11, pp. 173-182, 1976; J. B. Goodenough et al., in "Fast Na$^+$-ion transport skeleton structures", Materials Research Bulletin, Vol. 11, pp. 203-220, 1976; J. J. Bentzen et al., in "The preparation and characterization of dense, highly conductive Na$_5$GdSi$_4$O$_{12}$ NaSICON (NGS)", Materials Research Bulletin, Vol. 15, pp. 1737-1745, 1980; C. Delmas et al., in "Crystal chemistry of the Na$_{1+x}$Zr$_{2-x}$L$_x$(PO$_4$)$_3$ (L=Cr, In, Yb) solid solutions", Materials Research Bulletin, Vol. 16, pp. 285-290, 1981; V. von Alpen et al., in "Compositional dependence of the electrochemical and structural parameters in the NASICON system (Na$_{1+x}$Si$_x$Zr$_2$P$_{3-x}$O$_{12}$)", Solid State Ionics, Vol. 3/4, pp. 215-218, 1981; S. Fujitsu et al., in "Conduction paths in sintered ionic conductive material Na$_{1+x}$Y$_x$Zr$_{2-x}$PO$_4$)$_3$", Materials Research Bulletin, Vol. 16, pp. 1299-1309, 1981; Y. Saito et al., in "Ionic conductivity of NASICON-type conductors Na$_{1.5}$M$_{0.5}$Zr$_{1.5}$(PO$_4$)$_3$ (M: Al$^{3+}$, Ga$^{3+}$, Cr$^{3+}$, Sc$^{3+}$, Fe$^{3+}$, In$^{3+}$, Yb$^{3+}$, Y$^{3+}$)", Solid State Ionics, Vol. 58, pp. 327-331, 1992; J. Alamo in "Chemistry and properties of solids with the [NZP] skeleton", Solid State Ionics, Vol. 63-65, pp. 547-561, 1993; K. Shimazu in "Electrical conductivity and Ti$^{4+}$ ion substitution range in NASICON system", Solid State Ionics, Vol. 79, pp. 106-110, 1995; Y. Miyajima in "Ionic conductivity of NASICON-type Na$_{1+x}$M$_x$Zr$_{2-x}$P$_3$O$_{12}$ (M:Yb, Er, Dy)", Solid State Ionics, Vol. 84, pp. 61-64, 1996. These references are incorporated in their entirety herein by this reference.

While the alkali ion conducting separator materials disclosed herein encompass or include many formulations of alkali ion super ion conducting (MeSICON, where Me is an alkali metal) materials, this disclosure includes specific examples of ceramic membranes comprising NaSICON materials for the sake of simplicity. The focused discussion of NaSICON materials as one example of materials is not, however, intended to limit the scope of the invention. For example, the materials disclosed herein as being highly conductive and having high selectivity include those alkali super ion conducting materials that are capable of transporting or conducting any alkali cation, such as sodium (Na), lithium (Li), potassium (K), ions for separating electrodes of a nickel-metal hydride battery.

The alkali ion conducting solid electrolyte materials may be used or produced for use in the processes and apparatus of the present invention in any suitable form, as would be understood by one of ordinary skill in the art. In some specific embodiments, the form of the alkali ion conducting solid electrolyte may include at least one of the following: monolithic flat plate geometries, supported structures in flat plate geometries, monolithic tubular geometries, supported structures in tubular geometries, monolithic honeycomb geometries, or supported structures in honeycomb geometries.

In another embodiment, the alkali ion conducting separator 56 may be configured as a supported membrane structure. Supported structures or membranes may comprise dense layers of ion-conducting ceramic solid electrolyte supported on porous supports. A variety of forms for the supported membranes are known in the art and would be suitable for providing the supported membranes for alkali ion conducting separator with supported structures, including: ceramic layers sintered to below full density with resultant continuous open porosity, slotted-form layers, perforated-form layers, expanded-form layers including a mesh, or combinations thereof. In some embodiments, the porosity of the porous supports is substantially continuous open-porosity so that the liquid solutions on either side of the alkali ion conducting solid electrolyte may be in intimate contact with a large area of the dense-layers of alkali ion conducting ceramic solid electrolytes, and in some, the continuous open-porosity ranges from about 30 volume % to about 90 volume %. In some embodiments of the present invention, the porous supports for the supported structures may be present on one side of the dense layer of alkali ion conducting ceramic solid electrolyte. In some embodiments of the present invention, the porous supports for the supported structures may be present on both sides of the dense layer of alkali ion conducting ceramic solid electrolyte.

A variety of materials for the porous supports or supported membranes are known in the art and would be suitable for providing the porous supports for alkali ion conducting solid electrolyte materials, including: electrode materials, NaSICON-type materials, β$^I$-alumina, β$^{II}$-alumina, other ion-conducting ceramic solid electrolyte materials, and non-conductive materials such as plastics or ceramic materials, metals, and metal alloys. The thickness of the dense layer of alkali ion conducting solid electrolyte material in monolithic structures is generally from about 0.01 mm to about 5 mm, and in some instances from about 0.1 mm to about 1 mm. The thickness of the dense layer of alkali ion conducting ceramic solid electrolyte material in supported-structures is generally from about 25 μm to about 2 mm, and often from about 0.5 mm to about 1.5 mm. Layers as thin as about 25 μm to about 0.5 mm are readily producible, as would be understood by one of ordinary skill in the art.

In some specific embodiments, the porous substrate has similar thermal expansion and good bonding with the alkali ion conducting solid electrolyte as well as good mechanical strength. One of ordinary skill in the art would understand that the number and configuration of the layers used to construct the alkali ion conducting separator 56 as supported-structures could be widely varied within the scope of the invention.

In some embodiments, the alkali ion conducting solid electrolytes may be composites of alkali ion conducting ceramic solid electrolyte materials with non-conductive materials, where the non-conductive materials are poor ionic and electronic electrical conductors under the conditions of use. A variety of insulative non-conductive materials are also known in the art, as would be understood by one of ordinary skill in the art. In some specific embodiments, the non-conductive materials may include at least one of the following: ceramic materials, polymers, and/or plastics that are substantially stable in the media to which they are exposed.

Alternatively, an alkali ion conducting polymer electrolyte may also be used. Such a cation exchange membrane is made of a polymer with fixed anionic functional groups attached to a polymer backbone and alkali metal cations as mobile species. An example of such a cation exchange membrane is Nafion produced by DuPont or Fumapem produced by Fumatech GMBH or CM1 produced by Tokuyama Corporation. In some specific embodiments, the alkali ion conducting ceramic solid electrolyte material may be mixed with alkali ion conducting polymer electrolyte such as Nafion to form a composite membrane separator. Such a separator may be rigid or flexible and can be tape cast or otherwise fabricated in various forms. The polymer separator will allow some diffusion of hydrogen although lower than a microporous separator commonly used in the prior art.

Layered alkali ion conducting ceramic-polymer composite membranes are also particularly suitable for use as alkali ion conducting solid electrolytes in the present invention. Layered alkali ion conducting ceramic-polymer composite membranes generally comprise ion-selective polymers layered on alkali ion conducting ceramic solid electrolyte materials. In some specific embodiments, the alkali ion conducting ceramic solid electrolyte materials of the layered alkali ion conducting ceramic-polymer composite membranes may include at least one of the following: alkali ion super ion conducting type materials or beta-alumina. Ion-selective polymer materials have the disadvantage of having poor selectively to sodium ions, yet they demonstrate the advantage of high chemical stability and are flexible. Therefore, layered alkali ion conducting ceramic-polymer composite membranes of alkali ion conducting ceramic materials with chemically stable ionic-selective polymer layers may be suitable for use in the present invention. In some specific embodiments, the types of ion-selective polymer materials which may be used in the layered alkali ion conducting ceramic-polymer composite structure may include at least one of the following: polyelectrolyte perfluorinated sulfonic polymers, polyelectrolyte carboxylic acid polymers, Nafion® materials (from E.I. du Pont de Nemours, Wilmington, Del.) and polyvinyl chloride (PVC), matrix-based polymers, co-polymers or block-copolymers.

In some specific embodiments, the polymers for the layered alkali ion conducting ceramic-polymer composite membranes may include at least one of the following features and use characteristics, as would be understood by one of ordinary skill in the art: high chemical stability; high ionic conductivity; good adhesion to alkali ion conducting ceramic materials; and/or insensitivity to impurity contamination.

In some specific embodiments, the alkali ion conducting solid electrolyte may comprise two or more co-joined layers of different alkali ion conducting solid electrolyte materials. Such co-joined alkali ion conducting solid electrolyte layers could include alkali ion super ion conducting materials joined to other alkali ion conducting ceramic materials, such as, but not limited to, beta-alumina. Such co-joined layers could be joined to each other using a method such as, but not limited to, thermal spraying, plasma spraying, co-firing, joining following sintering, etc. Other suitable joining methods are known by one of ordinary skill in the art and are included herein.

The alkali ion conducting ceramic solid electrolyte materials disclosed herein are particularly suitable for use as a separator in nickel-metal hydride battery applications because they have high ion-conductivity for alkali metal cations at low temperatures, high selectivity for alkali metal cations, good current efficiency and stability in water and corrosive media under anticipated operating conditions, and very low or negligible permeability to hydrogen Comparatively, beta alumina is a ceramic material with high ion conductivity at temperatures above 300° C., but has low conductivity at temperatures below 100° C., making it less practical for applications below 100° C.

Sodium ion conductivity in NaSICON structures has an Arrhenius dependency on temperature, generally increases as a function of temperature. The sodium ion conductivity of ceramic membranes comprising NaSICON materials ranges from about $2 \times 10^{-3}$ S/cm to about $1 \times 10^{-1}$ S/cm from room temperature to 85° C.

Alkali ion conducting ceramic membranes comprising NaSICON materials, especially of the type described herein, have low or negligible electronic conductivity, and as such aid in virtually eliminating the occurrence of any self-discharge galvanic reactions. Certain NaSICON analogs according to the present invention have very mobile cations, including, but not limited to lithium, sodium, and potassium ions, that provide high ionic conductivity, low electronic conductivity and comparatively high corrosion resistance.

The following examples are given to illustrate various embodiments within the scope of the present invention. These are given by way of example only, and it is understood that the following examples are not comprehensive or exhaustive of the many types of embodiments of the present invention that can be prepared in accordance with the present invention.

Example 1

Construction and testing of $Ni(OH)_2$—NaSICON-M Battery

A commercial NiMH battery was discharged and the $Ni(OH)_2$ cathode and metal anode materials were extracted. No attempt was made to determine the composition of the anode material, "M", but material likely was one suitable for the adsorption of reduced hydrogen in an alkaline environment. The electrode materials were first filter washed with water to remove the potassium hydroxide electrolyte. A 50 wt. % aqueous sodium hydroxide solution was added such that stoichiometric amount of sodium hydroxide was present in the cathode. The sodium hydroxide functions not just an electrolyte but as participant in the cathodic reaction as follows:

$$Ni(OH)_2 + NaOH \leftrightarrow NiOOH + H_2O + Na^+ + e^-$$

The metal anode was also similarly washed with water. A 25 wt. % aqueous sodium hydroxide solution was added such that excess water was present in the analyte. The water is a participant in the anodic reaction as follows:

$$M + H_2O + Na^+ + e^- \leftrightarrow MH + NaOH$$

The present Ni(OH)$_2$—NaSICON-M battery was constructed from the above electrode materials. Stainless steel current collectors were used. A cylindrical two compartment cell fabricated of acetal plastic was used to test the performance of the battery. The first compartment was filled with the anode material and the second with the cathode material. A NaSICON membrane was O-ring sealed between two compartments. The active surface area of the membrane was 3.24 sq·cm.

Figure 3:
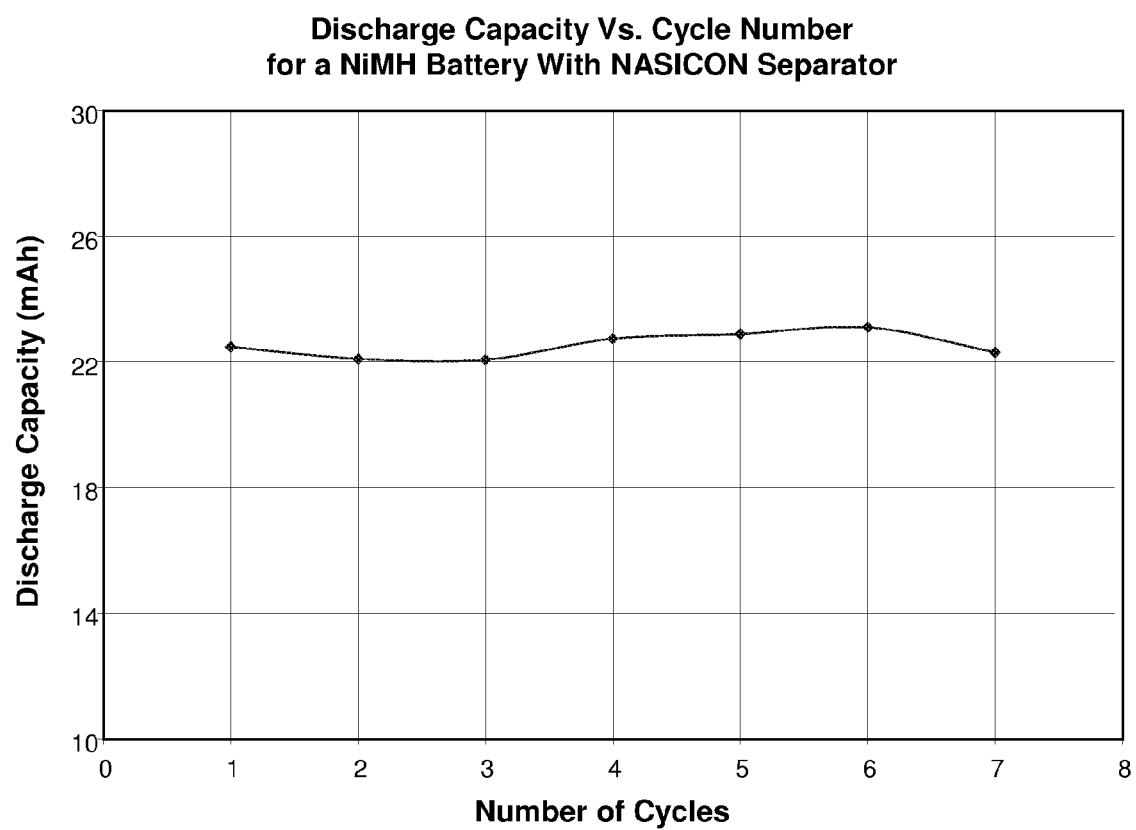
FIG. 3 is a graph of discharge capacity versus cycle number for a nickel metal hydride batter using a sodium ion super conducting separator.

The cells were charged and discharged at a constant current of 2 mA between 0.9 and 1.5 volts. The discharge capacity versus cycle number is shown in FIG. 3. FIG. 3 shows that the discharge capacity stays constant with cycle life. The battery was left on open circuit for up to 10 days in the charged state, but the discharge capacity remained stable, indicating good battery shelf life at room temperature.

The NASICON membrane is impermeable to hydroxyl ions and selectively is conductive primarily to sodium ions, Na$^+$, so the experiment showed that the electrodes normally used in the NiMH battery can be utilized in this novel manner which is conducive to improved shelf life.

While specific embodiments of the present invention have been illustrated and described, numerous modifications come to mind without significantly departing from the spirit of the invention, and the scope of protection is only limited by the scope of the accompanying claims.

The invention claimed is:

1. A nickel-metal hydride battery comprising:
    a positive electrode containing nickel hydroxide;
    a negative electrode containing a hydrogen storage alloy; and
    a separator comprising a substantially non-porous alkali ion conducting ceramic material disposed between the positive electrode and the negative electrode.

2. The nickel-metal hydride battery according to claim 1, wherein the separator comprises a specific alkali ion conductor.

3. The nickel-metal hydride battery according to claim 1, wherein the separator comprises a solid alkali metal ion super ion conducting material, wherein the alkali metal is Na, K, or Li.

4. The nickel-metal hydride battery according to claim 3, wherein the separator comprises a material having the formula Me$_{1+x}$Zr$_2$Si$_x$P$_{3-x}$O$_{12}$ where $0 \leq x \leq 3$, where Me is Na, K, or Li.

5. The nickel-metal hydride battery according to claim 4, wherein the separator comprises a material having the formula Na$_{1-30\ x}$Zr$_2$Si$_x$P$_{3-x}$O$_{12}$ where $0 \leq x \leq 3$.

6. The nickel-metal hydride battery according to claim 3, wherein the separator comprises a material having the formula Me$_5$RESi$_4$O$_{12}$ where Me is Na, K, or Li, where RE is Y, Nd, Dy, or Sm, or any mixture thereof.

7. The nickel-metal hydride battery according to claim 3, wherein the separator comprises a non-stoichiometric alkali-deficient material having the formula (Me$_5$RESi$_4$O$_{12}$)$_{1-\delta}$(RE$_2$O$_3$.2SiO$_2$)$_\delta$, where Me is Na, K, or Li, where RE is Nd, Dy, or Sm, or any mixture thereof and where $\delta$ is the measure of deviation from stoichiometry.

8. The nickel-metal hydride battery according to claim 1, wherein the separator comprises a monolithic flat plate, a monolithic tube, a monolithic honeycomb, or supported structures of the foregoing.

9. The nickel-metal hydride battery according to claim 1, wherein the separator comprises a layered alkali ion conducting ceramic-polymer composite membrane, comprising alkali ion-selective polymers layered on alkali ion conducting ceramic solid electrolyte materials.

10. The nickel-metal hydride battery according to claim 1, further comprising an alkaline electrolyte.

11. The nickel-metal hydride battery according to claim 10, wherein distinct alkaline electrolytes are positioned on either side of the separator at the positive and negative electrodes.

12. The nickel-metal hydride battery according to of claim 10, comprising electrolytes of different alkalinity on the other side of the separator.

13. The nickel-metal hydride battery according claim 11, further comprising a oxygen scavenger, a hydrogen scavenger or a mixture of the two.

14. The nickel-metal hydride battery according to claim 11, further comprising a corrosion inhibitor that prevents corrosion of the negative electrode in the charged or discharged state.

15. The nickel-metal hydride battery according to claim 10, wherein the concentration limits the capacity of the battery to prevent overcharging and overdischarging.

16. The nickel-metal hydride battery according to claim 1, wherein the separator prevents self discharge of the battery by transport of species present at one electrode to the other electrode.

17. The nickel-metal hydride battery according to claim 3, wherein the separator comprises a material having the formula Na$_{1+x}$(A$_y$Zr$_{2-y}$)(Si$_z$P$_{3-z}$)O$_{12-\delta}$, wherein A comprises one of Yb, Er, Dy, Sc, In, or Y, or mixtures or combinations thereof, $1.8 \leq x \leq 2.6$, $0 \leq y \leq 0.2$, $x < z$, and $\delta$ is selected to maintain charge neutrality.

18. A nickel-metal hydride battery comprising:
    a positive electrode containing nickel hydroxide;
    a negative electrode containing a hydrogen storage alloy; and
    a separator comprising a solid alkali metal ion super ion conducting material disposed between the positive electrode and the negative electrode, wherein the alkali metal is Na, K, or Li.

19. The nickel-metal hydride battery according to claim 18, wherein the separator comprises a material having the formula Me$_{1+x}$Zr$_2$Si$_x$P$_{3-x}$O$_{12}$ where $0 \leq x \leq 3$, where Me is Na, K, or Li.

20. The nickel-metal hydride battery according to claim 19, wherein the separator comprises a material having the formula Na$_{1+x}$Zr$_2$Si$_x$P$_{3-x}$O$_{12}$ where $0 \leq x \leq 3$.

21. The nickel-metal hydride battery according to claim 18, wherein the separator comprises a material having the formula Me$_5$RESi$_4$O$_{12}$ where Me is Na, K, or Li, where RE is Y, Nd, Dy, or Sm, or any mixture thereof.

22. The nickel-metal hydride battery according to claim 18, wherein the separator comprises a non-stoichiometric alkali-deficient material having the formula (Me$_5$RESi$_4$O$_{12}$)$_{1-\delta}$(RE$_2$O$_3$.2SiO$_2$)$_\delta$, where Me is Na, K, or Li, where RE is Nd, Dy, or Sm, or any mixture thereof and where $\delta$ is the measure of deviation from stoichiometry.

23. The nickel-metal hydride battery according to claim 18, wherein the separator comprises a monolithic flat plate, a monolithic tube, a monolithic honeycomb, or supported structures of the foregoing.

24. The nickel-metal hydride battery according to claim 18, wherein the separator comprises a layered alkali ion conducting ceramic-polymer composite membrane, comprising alkali ion-selective polymers layered on alkali ion conducting ceramic solid electrolyte materials.

25. The nickel-metal hydride battery according to claim 18, further comprising an alkaline electrolyte.

26. The nickel-metal hydride battery according to claim 25, wherein distinct alkaline electrolytes are positioned on either side of the separator at the positive and negative electrodes.

27. The nickel-metal hydride battery according to of claim 25, comprising electrolytes of different alkalinity on the other side of the separator.

28. The nickel-metal hydride battery according claim 26, further comprising a oxygen scavenger, a hydrogen scavenger or a mixture of the two.

29. The nickel-metal hydride battery according to claim 26, further comprising a corrosion inhibitor that prevents corrosion of the negative electrode in the charged or discharged state.

30. The nickel-metal hydride battery according to claim 25, wherein the concentration limits the capacity of the battery to prevent overcharging and overdischarging.

31. The nickel-metal hydride battery according to claim 18, wherein the separator prevents self discharge of the battery by transport of species present at one electrode to the other electrode.

32. The nickel-metal hydride battery according to claim 18, wherein the separator comprises a material having the formula $Na_{1+x}(A_y Zr_{2-y})(Si_z P_{3-z})O_{12-\delta}$, wherein A comprises one of Yb, Er, Dy, Sc, In, or Y, or mixtures or combinations thereof, $1.8 \leq x \leq 2.6$, $0 \leq y \leq 0.2$, $x<z$, and $\delta$ is selected to maintain charge neutrality.

33. A nickel-metal hydride battery comprising:
a positive electrode containing nickel hydroxide;
a negative electrode containing a hydrogen storage alloy;
a separator comprising an alkali ion conducting material disposed between the positive electrode and the negative electrode; and
distinct alkaline electrolytes positioned on either side of the separator at the positive and negative electrodes.

34. The nickel-metal hydride battery according to claim 33, wherein the separator comprises a substantially non-porous ceramic material.

35. The nickel-metal hydride battery according to claim 33, wherein the separator comprises a solid alkali metal ion super ion conducting material, wherein the alkali metal is Na, K, or Li.

36. The nickel-metal hydride battery according to claim 35, wherein the separator comprises a material having the formula $Me_{1+x}Zr_2Si_xP_{3-x}O_{12}$ where $0 \leq x \leq 3$, where Me is Na, K, or Li.

37. The nickel-metal hydride battery according to claim 36, wherein the separator comprises a material having the formula $Na_{1+x}Zr_2Si_xP_{3-x}O_{12}$ where $0 \leq x \leq 3$.

38. The nickel-metal hydride battery according to claim 35, wherein the separator comprises a material having the formula $Me_5RESi_4O_{12}$ where Me is Na, K, or Li, where RE is Y, Nd, Dy, or Sm, or any mixture thereof.

39. The nickel-metal hydride battery according to claim 35, wherein the separator comprises a non-stoichiometric alkali-deficient material having the formula $(Me_5RESi_4O_{12})_{1-\delta}(RE_2O_3 \cdot 2SiO_2)_\delta$, where Me is Na, K, or Li, where RE is Nd, Dy, or Sm, or any mixture thereof and where $\delta$ is the measure of deviation from stoichiometry.

40. The nickel-metal hydride battery according to claim 33, wherein the separator comprises a monolithic flat plate, a monolithic tube, a monolithic honeycomb, or supported structures of the foregoing.

41. The nickel-metal hydride battery according to claim 33, wherein the separator comprises a layered alkali ion conducting ceramic-polymer composite membrane, comprising alkali ion-selective polymers layered on alkali ion conducting ceramic solid electrolyte materials.

42. The nickel-metal hydride battery according to of claim 33, comprising electrolytes of different alkalinity on the other side of the separator.

43. The nickel-metal hydride battery according claim 33, further comprising an oxygen scavenger, a hydrogen scavenger or a mixture of the two.

44. The nickel-metal hydride battery according to claim 33, further comprising a corrosion inhibitor that prevents corrosion of the negative electrode in the charged or discharged state.

45. The nickel-metal hydride battery according to claim 33, wherein the concentration limits the capacity of the battery to prevent overcharging and overdischarging.

46. The nickel-metal hydride battery according to claim 33, wherein the separator prevents self discharge of the battery by transport of species present at one electrode to the other electrode.

* * * * *